United States Patent Office 3,220,965
Patented Nov. 30, 1965

3,220,965
MANUFACTURE OF NEW PIGMENT
COMPOSITIONS
Arnold Edwin Ambler, Manchester, England, assignor to Imperial Chemical Industries Limited, London, England, a corporation of Great Britain
No Drawing. Filed Dec. 27, 1960, Ser. No. 78,321
Claims priority, application Great Britain, Jan. 4, 1960, 199/60
9 Claims. (Cl. 260—22)

This invention relates to a process for the manufacture of new pigment compositions, and to new pigment compositions which are readily dispersible in non-aqueous media, especially in paint media.

Paints, printing inks and other non-aqueous coating compositions are normally manufactured by a process of grinding, or milling together a pigment (with which an extender may be incorporated) and a liquid non-aqueous medium consisting of a drying oil, or of a mixture of a volatile solvent and a non-volatile resinous material. Alternatively the pigment may be dispersed in the volatile solvent which is to form part of the liquid non-aqueous medium by milling in the presence of a suitable dispersing agent, and the stable dispersion so obtained may subsequently be mixed with the non-volatile resinous material. This latter procedure enables the paint user to obtain paints according to his own individual shade requirements quickly and conveniently by mixing together stable dispersions of suitable pigments and adding the non-volatile resinous material to the mixed dispersion so obtained. The stable dispersions, however, are only obtainable in dilute form, and in order to provide for varying shade demands, large volumes must be stored.

The present invention relates to a process for the manufacture of solid pigment compositions which are readily dispersible in non-aqueous media and from which paints or other coating compositions may be obtained by a process of simple mixing, without the necessity for any grinding or milling.

In the process of my invention I use a latex of a synthetic polymer which, in the dry state, is miscible to the extent of at least 2% and preferably at least 5% with the particular medium in which it is desired to disperse the pigment composition to be obtained, the particle size of the latex being between 0.01 micron and 0.5 micron.

When the said particular medium consists of a mixture of a volatile solvent and a non-volatile resinous material we may use a latex of a synthetic polymer which is soluble in the solvent constituent of the said medium. Thus, to obtain pigment compositions for use in alkyd resin paints I may use a polymer soluble in hydrocarbon solvents such as the petroleum fraction which has an approximate boiling range of from 150° to 200° C. and is known commercially as "white spirit"; to obtain pigment compositions for use in stoving enamels I may use a polymer soluble in xylene-butanol mixtures; and to obtain pigment compositions for use in polyvinyl chloride may use a polymer soluble in amyl acetate, acetone, or ethylene glycol monoethyl ether. In a similar way, to obtain pigment compositions for use in polyvinyl chlorine I may use a polymer soluble in plasticisers such as dibutyl, dioctyl and dinonyl phthalate and tricresyl phosphate. In all cases, however, it is essential that the polymer should be miscible with the complete medium in which it is desired to disperse the pigment composition.

According to the invention I provide a process for the manufacture of pigment compositions which are readily dispersible in non-aqueous media, which comprises flocculating an aqueous dispersion of a pigment in the presence of a latex as hereinbefore defined.

Pigments which may be used in the process of the invention may be of either the inorganic or organic type. As examples of pigments of the inorganic type there may be mentioned titanium dioxide, zinc oxide, cadmium sulphide, carbon black, iron oxides, ultramarine, cobalt blue, Prussian blue, lead chromate, and chromium oxide. As examples of pigments of the organic type there may be mentioned azo pigments, vat dye pigments, triphendioxazine pigments, phthalocyanine pigments for example copper phthalocyanine, its nuclear chlorinated, derivatives and copper tetraphenyl or octaphenyl phthalocyanine, quinacridone pigments, for example linear quinacridone, and the various pigments of the organic type which are described in volume 2 of "Colour Index, 2nd edition," published jointly in 1956 by the Society of Dyers and Colourists and the American Association of Textile Chemists and Colorists, under the heading of "Pigments."

All such pigments may be used in a concentrated form, and do not require the incorporation of other substances prior to use in the process of my invention.

Latices suitable for use in the process of my invention may be obtained by emulsion polymerisation of suitable monomers or mixtures of monomers, especially in the presence of a chain transfer agent such as an alkylmercaptan, for example t-amly or t-dodecyl mercaptan. Of particular interest are the latices obtained by emulsion polymerisation or co-polymerisation of one or more monomers selected from vinylalkylbenzenes, alkyl methacrylates and dialkylfumarates in presence of a chain transfer agent such as an alkyl mercaptan. The polymers contained in such latices are readily soluble in alkyd resin paint media (especially those incorporating drying or semi-drying oil alkyd resins) cellulose acetate and cellulose nitrate paint media and in plasticised polyvinyl chloride. In consequence such latices are of value in the process of the invention for producing pigment compositions which are readily dispersible in alkyd resin paint media, cellulose acetate and cellulose nitrate paint media and plasticised polyvinyl chloride. The pigment compositions obtained by the use of such latices are also readily dispersible in molten cellulose acetate, polythene, polypropylene and various waxes, oils and organic solvents.

To carry out the process of my invention an aqueous dispersion of the pigment (obtained, for example, by ball-milling the pigment with a dispersing agent and water) may be mixed with a suitable latex and the mixture may then be flocculated, for example by admixture with a suitable electrolyte such as a water-soluble acid or salt other than an alkali metal salt. The choice of electrolyte will depend upon the dispersing agent used to obtain the pigment dispersion, acids such as hydrochloric acid being particularly suitable as flocculating agents when the dispersing agent used is insoluble in acid media, for example Turkey red oil. It is desirable to carry out the flocculation under conditions of violent agitation or turbulence, for example by injecting the pigment latex mixture into a violently agitated aqueous solution of the electrolyte. After flocculation the products may be isolated, for example by filtration and washing, and dried. It is often advantageous to heat and subsequently to cool the mixture before filtration.

The pigment compositions obtained by means of the process of our invention are stable solids which are convenient to handle and to store. Because of their ready dispersibility they enable non-aqueous dispersions to be manufactured easily and quickly without the use of any grinding or milling machinery. In particular, pigment compositions of great value may be made by the use of latices obtained by emulsion polymerisation of commercial vinyl toluene, or of a mixture of commercial vinyl toluene and n- or iso-butyl methacrylate or of a mixture of commercial vinyl toluene and di-butylfumarate in such a manner that the polymer, when isolated and dried, is soluble in white spirit to the extent of at least 2%, and preferably at least 5%. Such pigment compositions are readily dispersible in alkyd resin paint media.

The invention is illustrated but not limited by the following examples in which the parts are by weight, and in which the abbreviation C.I. refers to "Colour Index" (second edition), published jointly by the Society of Dyers and Colourists and the American Association of Textile Chemists and Colorists.

Latices used in the examples may be obtained as follows:

LATEX A

A mixture of 25 parts of stearic acid, 350 parts of commercial vinyltoluene containing 64.6% m- and 35.4% p-vinyltoluene, 150 parts of n-butyl methacrylate and 1860 parts of water is stirred whilst 94 parts of 9.2% potassium carbonate, 5 parts of potassium persulphate and 21.1 parts of t-dodecylmercaptan are added. After flushing with nitrogen, the temperature is raised to 70° C. The temperature then rises to 88° C. exothermically during about 12 minutes, and finally the mixture is stirred at 90° to 95° C. for 30 minutes. The latex is then cooled and passed through a 60 mesh sieve to remove a little coagulated matter.

LATEX B

A mixture of 310 parts of water and 32 parts of 9.2% potassium carbonate was stirred at 90° to 95° C. under nitrogen whilst a mixture of 5 parts of stearic acid, 78 parts of commercial vinyltoluene, 20 parts of n-butyl methacrylate and 4.25 parts of t-dodecyl mercaptan is added during 30 minutes, simultaneously with a solution of 1 part of potassium persulphate in 50 parts of water. After stirring at 90° to 95° C. for a further 30 minutes, the latex is cooled.

LATEX C

The procedure described for Latex B is repeated, using 3.4 parts of t-amyl mercaptan instead of 4.25 parts of t-dodecyl mercaptan.

LATEX D

A mixture of 16.7 parts of stearic acid, 117 parts of vinyltoluene, 50 parts of isobutyl methacrylate and 590 parts of water are stirred whilst 53.5 parts of 9.2% potassium carbonate solution, 1.67 parts of potassium persulphate and 7 parts of t-dodecylmercaptan are added. After flushing with nitrogen the temperature is raised to 70° C. The temperature rises to 86.5° during 13 minutes and finally the mixture is stirred at 90° to 95° C. for 30 minutes. After cooling, the latex is passed through a 60 mesh sieve to remove a little coagulated matter. The particle diameter as determined by electron micrography is 0.07 micron.

LATEX E

A mixture of 27 parts of stearic acid, 1713 parts of water, 378 parts of vinyltoluene, 162 parts of n-butylmethacrylate and 23 parts of t-dodecyl mercaptan is stirred at 50° C. while 314 parts of 1.5 N ammonia solution is added, followed by a mixture of 5.4 parts of 30% hydrogen peroxide and 60 parts of water. The temperature is raised to 90° C. during 1 hour and the mixture is stirred at 90° to 95° C. for 1 hour. The latex is then cooled. The particle diameter as determined by electron micrography was 0.07 micron.

LATEX F

A mixture of 16.7 parts of stearic acid, 500 parts of water and 53.5 parts of 9.2% potassium carbonate solution is stirred at 80° C. After adding a solution of 1.67 parts of potassium persulphate in 90 parts of water the air is displaced by nitrogen. A mixture of 8.3 parts of t-dodecyl mercaptan and 159 parts of isobutyl methacrylate is gradually added during 1 hour. The mixture is stirred at 80° for a further 75 minutes and the latex is cooled.

LATEX G

A mixture of 50 parts of stearic acid, 161 parts of 9.2% potassium carbonate solution and 1770 parts of water is stirred at 80° C. After adding 1 part of potassium persulphate, the air is displaced by nitrogen. A mixture of 50.9 parts of t-dodecyl mercaptan and 449.4 parts of vinyltoluene is added during 85 minutes. After stirring at 80° C. for a further hour the latex is cooled. The particle diameter as determined by electron micrography is 0.1 micron.

LATEX H

A mixture of 16.7 parts of stearic acid and 600 parts of water is stirred at 80° C. while 9.6 parts of 30% sodium hydroxide solution is added followed by a solution of 0.33 part of potassium persulphate in 34 parts of water. After displacing the air by nitrogen a mixture of 17 parts of t-dodecyl mercaptan and 149 parts of vinyltoluene is added during 1 hour. After stirring at 80° C. for a further hour the latex is cooled. The particle diameter as determined by electron micrography is 0.02 to 0.03 micron.

When portions of the latices A, B, C, D, E, F, G and H are flocculated by addition of dilute hydrochloric acid, and the polymers isolated by filtration, washing and drying, the polymers are found to be soluble in a 69% oil length linseed pentaerythritol phthalate alkyd resin to the extent of at least 2%.

LATEX J 2 parts of potassium persulphate and 1.5 parts of sodium bicarbonate are dissolved in 100 parts of cold water (Solution A). 58.2 parts of commercial vinyltoluene (a mixture of m- and p-vinyltoluenes in the proportions of approximately 2 to 1), 33.1 parts of di-n-butylfumarate and 0.84 part of tert-amyl mercaptan are mixed (Solution B). 30 parts of Solution A is added at 80° C. to a stirred solution of 20 parts of 50% aqueous Turkey red oil in 300 parts of water. Under an atmosphere of nitrogen, Solution B and the remainder of Solution A are then gradually added during 4 hours with continued stirring at 80° C. After stirring for a further 4 hours at 80° C. the mixture is cooled. The resulting latex is filtered to remove a small quantity of coagulated material.

When a portion of the latex obtained in this way is flocculated by addition of dilute hydrochloric acid, and the polymer isolated by filtration, washing and drying, the polymer is found to be soluble in white spirit to the extent of at least 5%.

*Example 1*

100 parts of an aqueous paste containing 20% of a copper chlorophthalocyanine having a chlorine content of 3.3% is mixed with 4 parts of a 50% aqueous solution of Turkey red oil and ball-milled for 24 hours. To the fluid dispersion so obtained there are added 50 parts of Latex J. The mixture is then added, with vigorous stirring to 1000 parts of 2 N hydrochloric acid, stirring is continued for 1 hour and the flocculated solid is filtered off, washed acid-free and dried by exposure to the atmosphere. The coarse powder obtained is readily dispersible in a 15% white spirit solution of a linseed oil modified alkyd resin.

*Example 2*

20 parts of a copper chlorophthalocyanine having a chlorine content of 3.3%, 2 parts of potassium stearate and 78 parts of water are ball-milled to give a dispersion in which all the particles are below 10 microns in diameter. 60 parts of Latex E are added and the mixture is stirred vigorously. 50 parts of concentrated sulphuric acid are added to 550 parts of water and the mixture of pigment and latex is added with violent agitation. The flocculated product is filtered, washed free from acid and dried at 30° C.

The resultant blue powder is readily dispersible at atmospheric temperature in alkyd resin paint media (particularly in a 69% oil length linseed pentaerythritol phthalate alkyd resin) cellulose acetate and cellulose nitrate paint media, linseed oil, lithographic varnish, and also readily dispersible molten cellulose acetate, polythene, polypropylene, plasticised polyvinyl chloride and various waxes, oils and organic solvents.

*Example 3*

20 parts of the scarlet pigment C.I. 12120, 2 parts of potassium stearate and 78 parts of water are ball-milled to give a dispersion in which all the particles are less than 10 microns in diameter. 40 parts of Latex G are added and the mixture is vigorously stirred. The mixture is then flocculated by the procedure described in Example 2 and the product is filtered, washed and dried. The resultant scarlet powder is readily dispersible at atmospheric temperature in alkyd resin paint media, linseed oil, cellulose acetate and cellulose nitrate paint media and lithographic varnish.

*Example 4*

100 parts of an aqueous suspension of a molybdated lead chromate pigment (containing 20 parts of pigment and 3 parts of potassium oleate) is milled to give a dispersion in which all the particles are below 10 microns in diameter. 80 parts of Latex G are added and the mixture is stirred vigorously. 50 parts of concentrated sulphuric acid are added to 500 parts of water and the mixture of pigment and latex is added with violent agitation. The flocculated product is filtered, washed free from acid, and dried at 30° C. The dry powder so obtained is readily dispersible in alkyd resin paint media (particularly in a 69% oil length linseed pentaerythritol phthalate alkyd resin) linseed oil, cellulose acetate and cellulose nitrate paint media, lithographic varnish, and plasticised polyvinyl chloride. In place of Latex G in this example there may be used Latex A, B, C, D, E, F or H.

By following the procedure of Example 4, using any of the latices A, B, C, D, E, F, G or H pigment compositions which are readily dispersible in alkyd resin and other paint media, lithographic varnish and plasticised polyvinyl chloride are obtained from the following pigments:

Lead chromate
Brunswick green
Prussian blue
Carbon black
Yellow azo pigment, C.I. 11710
Red azo pigment, C.I. 12420
Yellow azo pigment, C.I. 21090
Rubine toner, C.I. 15865 lake
Pink toner, C.I. 45160 lake
The iron complex of α-nitroso-β-naphthol
Copper hexadecachlorophthalocyanine
Copper tetrabromododecachlorophthalocyanine
6:6'-dichloro-4:4'-dimethylthioindigo
Flavanthrone
Dibromoanthrone
Indanthrone
Linear quinacridone in γ-crystal phase
Linear quinacridone in β-crystal phase

What I claim is:

1. A process for the manufacture of pigmented non-aqueous coating compositions which comprises mixing an aqueous pigment dispersion with a latex of a normally solid synethtic polymer which in the dry state is miscible to the extent of at least 2% with the medium of said non-aqueous coating composition, the particle size of the latex being between 0.01 and 0.5 micron, flocculating the so-formed mixture of pigment dispersion and latex, isolating and drying the flocculated mixture and mixing the so-obtained solid product with said coating composition medium by means of simple agitation involving low shear.

2. Process according to claim 1 wherein the synthetic polymer is miscible to the extent of at least 5% with said non-aqueous coating composition medium.

3. Process according to claim 1 wherein the synthetic polymer is a polymer of at least one monomer selected from the group consisting of vinylalkylbenzenes, alkyl methacrylates and dialkylfumarates.

4. Process according to claim 1 wherein the synthetic polymer is a polymer of m-vinyltoluene and p-vinyltoluene.

5. Process according to claim 1 wherein the synthetic polymer is a copolymer of m-vinyltoluene, p-vinyltoluene and butylmethacrylate.

6. Process according to claim 1 wherein the synthetic polymer is a copolymer of m-vinyltoluene, p-vinyltoluene and dibutylfumarate.

7. The pigmented non-aqueous coating composition obtained by the process of claim 1.

8. Process according to claim 3 wherein said non-aqueous coating composition medium is selected from the group consisting of paint and printing ink media.

9. Process according to claim 1 wherein said medium is a drying oil alkyd resin.

References Cited by the Examiner

UNITED STATES PATENTS

| | | | |
|---|---|---|---|
| 2,615,006 | 10/1952 | Lane | 260—37 |
| 2,719,133 | 9/1955 | Smith | 260—29.7 |
| 2,751,369 | 6/1956 | Te Grotenhuis | 260—41 |
| 2,845,397 | 7/1958 | Mills | 260—3 |
| 2,857,351 | 10/1958 | Carrol | 260—28.5 |
| 3,008,937 | 11/1961 | Ruffrig et al. | 260—86.7 |

FOREIGN PATENTS 660,356 11/1951 Great Britain.

MORRIS LIEBMAN, *Primary Examiner.*

DANIEL ARNOLD, LEON J. BERCOVITZ, *Examiners.*